United States Patent [19]

Nakazawa et al.

[11] Patent Number: 5,198,311

[45] Date of Patent: Mar. 30, 1993

[54] LNG CRYOGENIC POWER GENERATION SYSTEM USING MOLTEN CARBONATE FUEL CELLS

[75] Inventors: Kenzo Nakazawa; Hiroyoshi Uematsu, both of Yokohama; Satoshi Hatori, Ibaraki, all of Japan

[73] Assignee: Ishikawajima-Harima Heavy Industries Co., Ltd., Tokyo, Japan

[21] Appl. No.: 704,078

[22] Filed: May 22, 1991

[30] Foreign Application Priority Data

May 30, 1990 [JP] Japan ............................ 2-140398

[51] Int. Cl.⁵ ................................................ H01M 8/04
[52] U.S. Cl. ........................................... 429/20; 429/26
[58] Field of Search ............................................ 429/20, 26

[56] References Cited

U.S. PATENT DOCUMENTS 4,588,659 5/1986 Abens et al. ............................ 429/20

FOREIGN PATENT DOCUMENTS 2500217 8/1982 France .

OTHER PUBLICATIONS

Ishida, *Patent Abstracts of Japan*, 57-80674, May, 1982 (E-126, p. 103).
Azuhata, *Patent Abstracts of Japan* 56-69775, Jun. 1981 (E-71, p. 63).
European Search Report, EP application No. 9110 8578.5, Aug. 27, 1991.
Patent Abstracts of Japan, unexamined applications, M field, vol. 7, No. 149, Jun. 30, 1983 The Patent Office Japanese Government p. 104 M 225-Kokai-No. 58-59 303 (A) (Tokyo Shibaura Denki K.K.).

*Primary Examiner*—Stephen Kalafut
*Attorney, Agent, or Firm*—Trexler, Bushnell, Giangiorgi & Blackstone, Ltd.

[57] ABSTRACT

An LNG cryogenic power generation system using a molten carbonate fuel cell is equipped with a $CO_2$ separator. The $CO_2$ separator takes advantages of cryogenic LNG in a manner such that $CO_2$ among gases discharged from an anode chamber of the fuel cell is liquefied with cryogenic LNG and separated from the anode exhaust gas. Cell reactions take place at a cathode chamber and the anode chamber of the fuel cell to cause power generation as the oxidizing gas which contains $CO_2$ is fed to the cathode chamber and the fuel gas is fed to the anode chamber. LNG is reformed by a reformer of the fuel cell and the reformed gas is fed to the anode chamber. During the cell reaction, $CO_2$ of the oxidizing gas fed to the cathode chamber is transferred as carbonate ion to the anode chamber and $CO_2$ is enriched or concentrated before expelled from the anode chamber. This anode gas is introduced to the $CO_2$ separator. In the $CO_2$ separator, $CO_2$ among the anode gas is liquefied by cryogenic LNG and separated from the anode gas. As a result, the power generation and the $CO_2$ recovery are carried out at the same time, and an amount of $CO_2$ discharged to atmosphere is remarkably reduced.

28 Claims, 5 Drawing Sheets

LNG CRYOGENIC POWER GENERATION SYSTEM USING MOLTEN CARBONATE FUEL CELLS

BACKGROUND OF THE INVENTION

1. Technical Field

The present invention relates to a cryogenic power generation system employing fuel cells, and particularly to an LNG cryogenic power generation system equipped with a $CO_2$ separator taking advantages of cryogenic LNG.

2. Background Art

Power generation systems using fuel cells are known in the art and some systems employ molten carbonate fuel cells. A conventional molten carbonate fuel cell generally includes an electrolyte plate (tile) soaked with carbonate, a cathode chamber (oxygen electrode) and an anode chamber (fuel electrode). The electrolyte plate is made from a porous material and the carbonate serves as the electrolyte. The electrolyte plate is sandwiched by the cathode chamber and the anode chamber. Oxidizing gas is introduced to the cathode chamber and fuel gas in introduced to the anode chamber to cause the power generation due to an electrical potential difference between the cathode chamber and the anode chamber. In a conventional power generation system using molten carbonate fuel cells, the above-described fuel cells are generally stacked one after another via separators to define a multi-layer fuel cell unit or a stack of fuel cells.

One example of such power generation systems is illustrated in FIG. 5 of the accompanying drawings. As illustrated in FIG. 5, before air A reaches a cathode chamber 102 of a fuel cell 100 via an air feed line 108, the air A is compressed by a compressor 104, cooled by a cooling device 105, compressed by another compressor 106 and preheated by an air preheater 107. Part of the air A in the air feed line 108 is branched to a reformer 110 by a branch line 109. Gases CG discharged from the cathode chamber 102 (also called "cathode exhaust gas CG") are introduced to a turbine 112 through an exit line 111 and expelled via the air preheater 107. Gases AG discharged from the anode chamber 103 (also called "anode exhaust gas AG") contain $H_2O$ and $CO_2$. Thus, moisture $H_2O$ of the anode exhaust gas AG is removed and the separated moisture $H_2O$ is recirculated to the system. The anode exhaust gas AG of the fuel cell 100 is cooled by a heat exchanger 113, heat-exchanged with natural gas NG in a preheater 114 and cooled by another cooling device 116. In the cooling device 116, the anode exhaust gas AG is condensed, then introduced to a gas-liquid separator 117 to separate moisture component from gas component. The gas component which contains $CO_2$ is fed to a combustion chamber of the reformer 110 by a blower 118 through a line 119 extending to the heat exchanger 113. The moisture or water component $H_2O$ is pressurized by a pump 120 and fed to an evaporator 121. In the evaporator 121, the water $H_2O$ is heated to steam, then fed to an entrance of the reformer 110 via a superheater 115 through a line 122 such that it is mixed with the natural gas NG. Fuel gas produced in the reformer 110 is introduced to the anode chamber 103 of the fuel cell 100 by a piping 123. Gases discharged from the combustion chamber of the reformer 110, which contain $CO_2$, are fed to the cathode chamber 102 of the fuel cell 100 through a line 124 together with the air of the line 108. An evaporator 115 is provided between the preheater 114 and the cooling device 116 such that the anode exhaust gas AG flows therethrough. Numeral 101 designates an electrolyte plate and numeral 125 designates a desulfurizer.

In the above-described power generation system using molten carbonate fuel cells, the moisture $H_2O$ of the anode exhaust gas AG discharged from the anode chamber 103 is removed by the gas-liquid separator 117, and the $CO_2$-containing-gases are combusted in the combustion chamber of the reformer 110 before they are fed to the cathode chamber 102. Therefore, a $CO_2$ separation from the gases and a recovery of $CO_2$ are not considered. Consequently, the conventional power generation system is not designed to recover $CO_2$ and $CO_2$ is expelled to atmosphere.

SUMMARY OF THE INVENTION

An object of the present invention is to provide an LNG cryogenic power generation system using molten carbonate fuel cells in which a $CO_2$ separator is provided to separate $CO_2$ contained in the anode exhaust gas and cryogenic LNG is used for the $CO_2$ separation.

Another object of the present invention is to provide an LNG cryogenic power generation system using molten carbonate fuel cells in which separated $CO_2$ is recovered in the form of gas.

Still another object of the present invention is provide an LNG cryogenic power generation system using fuel cells in which the $CO_2$ recovered as gas is fed to cathode chambers of the fuel cells.

According to one aspect of the present invention, there is provided an LNG cryogenic power generation system using molten carbonate fuel cells with oxidizing gas being fed to a cathode chamber of the fuel cell and reformed gas or LNG being fed to an anode chamber of the fuel cell, characterized in that a $CO_2$ separator is provided and the $CO_2$ separator takes advantages of cryogenic LNG in a manner such that $CO_2$ among gases discharged from the anode chamber is liquefied with cryogenic LNG and separated from the anode exhaust gas. Cell reactions take place at the cathode chamber and the anode chamber to cause power generation as the oxidizing gas which contains $CO_2$ is fed to the cathode chamber of the molten carbonate fuel cell and the fuel gas is fed to the anode chamber. At the same time, $CO_2$ of the oxidizing gas fed to the cathode chamber is transferred as carbonate ion to the anode chamber and $CO_2$ is enriched or concentrated before expelled from the anode chamber. This anode gas is introduced to the $CO_2$ separator. In the $CO_2$ separator, $CO_2$ among the anode gas is liquefied by cryogenic LNG and separated from the anode gas. As a result, the power generation and the $CO_2$ recovery are carried out at the same time, and an amount of $CO_2$ discharged to atmosphere is remarkably reduced. Further, less power is necessary for the $CO_2$ separation as compared with a conventional system since $CO_2$ is concentrated prior to the recovering. Moreover, the very low temperature which cryogenic LNG possesses is effectively used for the $CO_2$ separation so that an energy efficiency of the entire system is improved. Conventionally, very low temperature LNG is just expelled to atmosphere. Besides, since the liquefied and separated $CO_2$ is recovered as it is, an amount of LNG used for the $CO_2$ liquefaction can be raised and an amount of natural gas to be gasified can be raised. This is desirable in a case where the system uses a large amount of natural gas.

According to another aspect of the present invention, there is provided an LNG cryogenic power generation system using fuel cells with oxidizing gas being fed to a cathode chamber of the fuel cell and reformed LNG being fed to an anode chamber of the fuel cell to cause power generation characterized in that $CO_2$ contained in gases discharged from the anode chamber is separated therefrom by liquefying $CO_2$ with LNG of cryogenic temperature. The power generation system is provided with a $CO_2$ separator which performs the $CO_2$ separation using LNG. The $CO_2$ separator has a gas recovery portion which gasifies the liquefied $CO_2$ and recovers it. Therefore, the $CO_2$ is recovered in the form of gas.

According to still another aspect of the present invention, there is provided an LNG cryogenic power generation system using fuel cells with oxidizing gas being fed to a cathode chamber of the fuel cell and reformed LNG being fed to an anode chamber of the fuel cell, characterized in that there is provided a $CO_2$ separator which liquefies $CO_2$ contained in gases discharged from the anode chamber of the fuel cell with LNG of very low temperature, the $CO_2$ separator has a gas recovery portion which gasifies the liquefied $CO_2$ and collects it, the gasified $CO_2$ is transferred to the cathode chamber of the fuel cell by a line (called "second gas line" in a preferred embodiment), and gases discharged from the $CO_2$ separator which gases no longer contain $CO_2$ are transferred to the anode chamber of the fuel cell by another line (called "third gas line" in a preferred embodiment). A power generation efficiency is improved since the gasified $CO_2$ is introduced to the cathode chamber and the gases which do not contain $CO_2$ are introduced as the fuel gas to the anode chamber.

DESCRIPTION OF THE PREFERRED EMBODIMENTS

Figure 1:
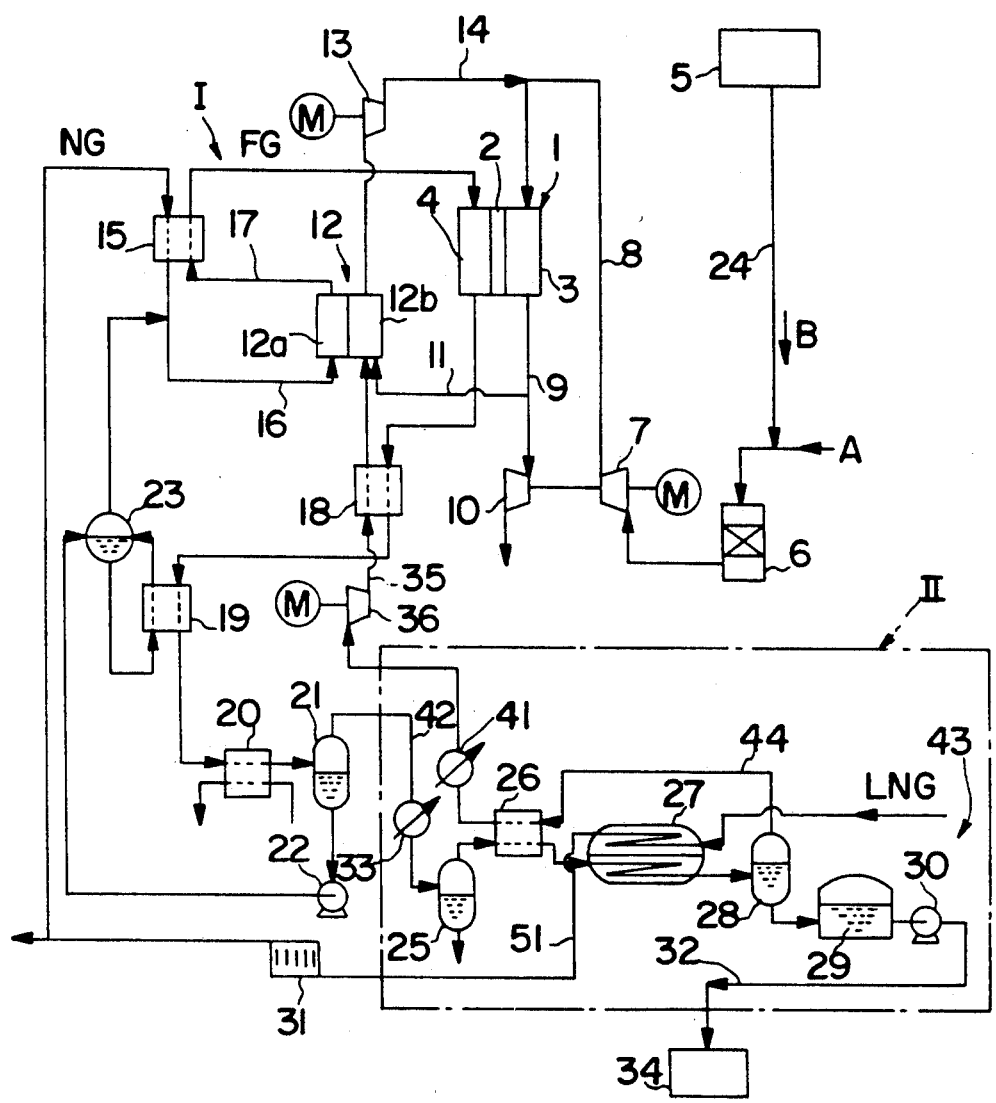
FIG. 1 shows a schematical block diagram of an LNG cryogenic power generation system using fuel cells according to a preferred embodiment of the present invention.

Now, preferred embodiments will be described with the accompanying drawings. FIGS. 1 through 4 illustrate preferred embodiments of the present invention respectively and same numerals are given to similar elements through these Figures. The symbol M is used in the drawings to designate a motor in each instance. The abbreviation "ata" is used herein as a unit of pressure, 1 ata being equal to 98.07 kPa.

Referring first to FIG. 1, shown is a fundamental arrangement of an LNG cryogenic power generation system I according to the present invention. The power generation system I according generally includes a plurality of fuel cells 1, but there is shown only one fuel cell 1 for the illustrative purpose.

In the cryogenic power generation system I, gases B containing $CO_2$ which are discharged from a natural gas thermal electric power plant 5 are introduced to a cathode chamber 3 of a molten carbonate fuel cell 1 together with fresh air A whereas natural gas (raw material gas to be reformed) is reformed and fed to an anode chamber 4 of the fuel cell 1. The cryogenic power generation system I is equipped with a $CO_2$ separator II which liquefies $CO_2$ with cryogenic LNG to separate $CO_2$ from the gases. The $CO_2$ separator II also recovers the liquefied $CO_2$.

The LNG cryogenic power generation system I includes the molten carbonate fuel cell 1 and the fuel cell 1 includes an electrolyte plate 2 sandwiched by the cathode chamber 3 and the anode chamber 4. The electrolyte plate 2 is soaked with carbonate and such a fuel cell 1 is defined as the molten carbonate type fuel cell. The fresh air A which has passed through a filter 6 is compressed by a compressor 7. The compressed air A flows in an air feed line 8 extending to the cathode chamber 3. Gases discharged from the cathode chamber 3 (called "cathode exhaust gas") are partially transferred to a turbine 10 by a cathode chamber exit line 9 and expelled to atmosphere. The remainder of the cathode exhaust gas is introduced to a combustion chamber 12b of a reformer 12 by a branch line 11. Gases discharged from the combustion chamber 12b of the reformer 12 are pressurized by a blower 13 and fed to the cathode chamber 3 by a line 14. On the other hand, the natural gas NG is preheated by a preheater 15 and introduced to a reforming chamber 12a of the reformer 12 by a natural gas feed line 16. In the reforming chamber 12a, the natural gas NG is reformed to fuel gas FG and then fed into the anode chamber 4 by a fuel gas feed line 17. Gases discharged from the anode chamber 4 (called "anode gas") are introduced to a first gas-liquid separator 21 via a heat exchanger 18, an evaporator 19 and a condenser 20. In the first gas-liquid separator 21, moisture ($H_2O$) of the anode gas is separated from the anode gas. Then, gases which do not contain the moisture but contain $CO_2$ are introduced to the $CO_2$ separator II. In the $CO_2$ separator II, the gases are cooled such that the $CO_2$ component is liquefied and the $CO_2$ component is separated from the gas component. After that, the liquefied $CO_2$ is recovered. $H_2O$ separated by the first gas-liquid separator 21 is pressurized by a pump 22 and transferred to a liquid pool device (container) 23. Then, the water $H_2O$ is vaporized by the evaporator 19 to steam and the steam is introduced to the natural gas feed line 16. The gases B from the thermal electric power plant 5 are led into the filter 6 by a line 24 and then into the air feed line 8.

The $CO_2$ separator device II includes a cooling device 33, a second gas-liquid separator 25, a gas heat exchanger 26, an indirect heating type heat exchanger 27, a $CO_2$ gas-liquid separation drum 28, a liquid recovery portion 43, an open-rack vaporizer and a heater 41. The liquid recovery portion 43 includes a storage tank 29 and a pump 30. The pump 30 is used to pump the liquid $CO_2$. The heat exchanger 27 is used for the $CO_2$ liquefaction. The anode gas which contains $CO_2$ discharged from the first gas-liquid separator 21 is forced into the line 42 and cooled by the cooling device 33. If the anode gas contains moisture, the moisture is removed at the second gas-liquid separator 25 before the anode gas is fed to the gas heat exchanger 26. This is because the moisture would condense in the heat exchangers 26 and/or 27 and cause the clogging or closing of the heat exchanger(s). The anode gas cooled in the heat exchanger 26 is transferred to the indirect-heat-exchanging type heat exchanger 27. This heat exchanger 27 is used for the CO₂ liquefaction. In the heat exchanger 27, CO₂ contained in the anode gas is cooled to liquid with LNG of cryogenic temperature. The liquefied CO₂ is removed by the CO₂ separating drum 28. The pressure of the anode gas coming from the anode chamber 4 is generally about 7 ata. However, since CO₂ is not condensed until the partial pressure of CO₂ reaches a value below 5.2 ata, the gas pressure in the CO₂ separator device II is maintained to or above 5.2 ata and the anode gas is cooled enough to condense CO₂ of the anode gas completely in the heat exchanger 27.

The liquefied CO₂ is transferred to the liquid CO₂ treating device 34. Therefore, the liquid CO₂ flows into the liquid CO₂ treating device 34 from the gas-liquid separating drum 28 via the storage tank 29, the pump 30 and a first CO₂ recovery line 32. On the other hand, LNG which is used to liquefy CO₂ at the heat exchanger 27 is gasified in the heat exchanger 27 and becomes natural gas NG. Part of the natural gas NG flows into the natural gas feed line 16 via the line 51 and the open-rack vaporizer 31. Gases (H₂O and CO) going out of the heat exchanger 27 are introduced to a residual gas line 44 from the gas-liquid separating drum 28, then introduced to the heat exchanger 26 to cool the anode gas. After that, these gases are heated by the heater 41 and transferred to the first gas line 35 from the CO₂ separator unit II. H₂O and CO are then compressed by the blower 36 and fed back to the cathode chamber 3 via the combustion chamber 12b.

When CO₂ among the gases B discharged from the electric power plant 5 is desired to be recovered, the gases B are led into the gas line 24 and the air feed line 8 such that the gases B are compressed by the compressor 7 with the air A before they are introduced to the cathode chamber 3. On the other hand, part of natural gas NG gasified at the CO₂ separator unit II is introduced to the natural gas feed line 16 so as to reform that part of natural gas NG and then it is fed as the fuel gas FG into the anode chamber 4 to cause cell reactions at the cathode chamber 3 and the anode chamber 4. CO₂ is therefore concentrated when it is expelled from the anode chamber 4. In the cathode chamber, on the other hand, a following reaction takes place:

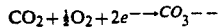

$$CO_2 + \tfrac{1}{2}O_2 + 2e^- \rightarrow CO_3^{--}$$

Therefore, CO₂ is transformed to carbonate ion $CO_3^{--}$. The carbonate ion $CO_3^{--}$ migrates within the electrolyte plate 2 and reaches the anode chamber 4. In the anode chamber 4, a following reaction takes place:

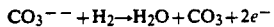

$$CO_3^{--} + H_2 \rightarrow H_2O + CO_3 + 2e^-$$

Power generation proceeds as the cell reactions advance in the cathode chamber 3 and the anode chamber 4. At the same time, CO₂ is transferred to the anode chamber 4 from the cathode chamber 3. The gas flow rate across the anode chamber 4 is smaller than that across the cathode chamber 3, namely between one ninth and one second that at the cathode chamber 3. Thus, CO₂ transferred to the anode chamber 4 is enriched due to the flow rate difference. The CO₂ concentration in the anode chamber 4 is several times that in the cathode chamber 3. This means that the power generation takes place in the fuel cell 1 and at the same time CO₂ is enriched or concentrated in the fuel cell 1.

The anode gas whose CO₂ is enriched at the anode chamber 4 is introduced to the heat exchanger 18, the evaporator 19, the condenser 20 and the first gas-liquid separator 21. In the first gas-liquid separator 21, the mositure (H₂O) is removed from the anode gas, and then the anode gas is led into the CO₂ separation unit II. After passing through the CO₂ separation unit II, the anode gas is led into the cooling device 33 and the second gas-liquid separator 25. In the second gas-liquid separator 25, another moisture removal is carried out. Then, the anode gas is heat exchanged with the low temperature gas in the heat exchanger 26. The anode gas is cooled due to this heat exchange and CO₂ contained in the anode gas is then cooled with very low temperature LNG in the indirect heating type heat exchanger 27 so that the liquefied CO₂ is obtained. The liquefied CO₂ is separated from the gaseous component in the gas-liquid separating drum 28 and introduced to the storage tank 29 for an equalization of loads on the CO₂ treating device 34. CO₂ is then pumped up by the pump 30 to the CO₂ treating device 34 via the first recovery line 32. This reduces an amount of CO₂ to be expelled to atmosphere which contributes to the suppression of the greenhouse effect of the earth.

In this embodiment, since CO₂ is recovered in the form of liquid, it is possible to design a system in which a large amount of LNG is used to liquefy CO₂ at the indirect heating type heat exchanger 27. Consequently, a large amount of natural gas NG can be used in the system. This is desirable in a certain case since some systems require a large amount of natural gas for the power generation.

Figure 2:
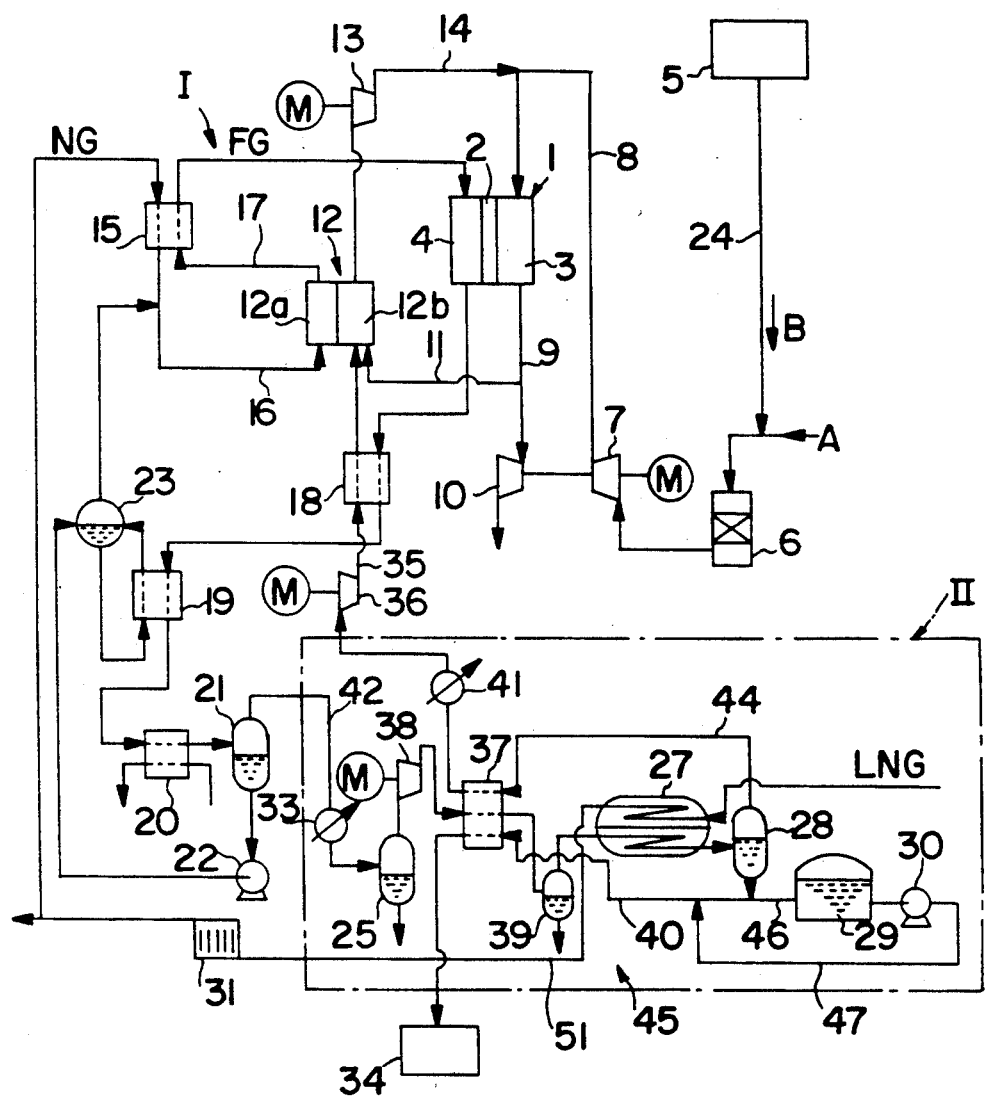
FIG. 2 is a schematic block diagram of another power generation system according to the present invention.

FIG. 2 shows another LNG cryogenic power generation system according to the present invention. In this embodiment, the CO₂ separator unit II is also provided with a gas recovery portion 45 which gasifies the liquefied CO₂ and recovers the gaseous CO₂. More specifically, instead of the gas heat exchanger 26 of the foregoing embodiment, there is provided a low temperature heat recovering, multi-fluid type heat exchanger 37. In addition, a compressor 38 is provided to compress gases discharged from the second gas-liquid separator 25 before these gases are introduced to the heat exchanger 27, a third gas-liquid separator 39 is provided on a line 42 extending between the heat exchangers 37 and 27 and a second recovery line 40 is provided to transfer part of the liquid CO₂ into the multi-fluid heat exchanger 37 from the gas-liquid separator drum 28 such that the heat exchange at the multi-fluid heat exchanger 37 takes advantages of low temperature liquid CO₂ as well as non-CO₂ containing gases of the line 44 (called "residual gas") and such that the CO₂ containing gases of the line 42 are cooled by this heat exchange in the multi-fluid heat exchanger 37. CO₂ used for the heat exchange is gasified and recovered through the second recovery line 40. Further, a branch line 46 is provided to introduce the remaining liquid CO₂ to the storage tank 29 from the gas-liquid separator drum 28 and the liquid CO₂ in the storage tank 29 is recirculated to the second recovery line 40 via the pump 29 and the recirculation line 47 such that it merges with the liquid flowing into the multi-fluid heat exchanger 37. Other arrangements are similar to those illustrated in FIG. 1.

In the embodiment shown in FIG. 2, the anode gas introduced to the CO₂ separator unit II is transferred to the multi-fluid heat exchanger 37 via the cooling device 33, the first gas-liquid separator 35 and the compressor 38. In the multi-fluid heat exchanger 37, the anode gas is heat exchanged with the non-liquid-containing gases and the liquid so that part of $CO_2$ is liquefied. $CO_2$ is further liquefied with LNG of low temperature in the indirect heating type heat exchanger 27. The liquefied $CO_2$ is introduced to the storage tank 29 via the $CO_2$ gas-liquid separation drum 28. In this case, part of the liquid $CO_2$ is directly fed to the multi-fluid heat exchanger by the second recovery line 40 so that low temperature thereof is used to cool the anode gas and consequently that part of $CO_2$ is gasified again. The gasified $CO_2$ is taken out of the multi-fluid heat exchanger 37 and transferred to the $CO_2$ treating device 34. Therefore, the gasified $CO_2$ is not discharged to atmosphere. Gases which are not condensed in the indirect heating type heat exchanger 27 are introduced to the multi-fluid heat exchanger 37 by the residual gas line 44 from the $CO_2$ gas-liquid separator drum 28. Then, these residual gases flow through the heater 41, the blower 36 of the power generation system I, the heat exchanger 18 and the combustion chamber 12b of the reformer 12. This means that the residual gases are recirculated to the cathode chamber 3.

In this system, since the compressor 38 pressurizes the gases discharged from the first gas-liquid separator 25, the gas pressure in the $CO_2$ separator unit II can be maintained at or above 5.2 ata. In addition, raising the gas pressure results in the improvement of the $CO_2$ liquefaction efficiency at the $CO_2$ liquefaction indirect heating type heat exchanger 27. As a result, the blower 36 may not be required if the gas pressure allows it.

Figure 3:
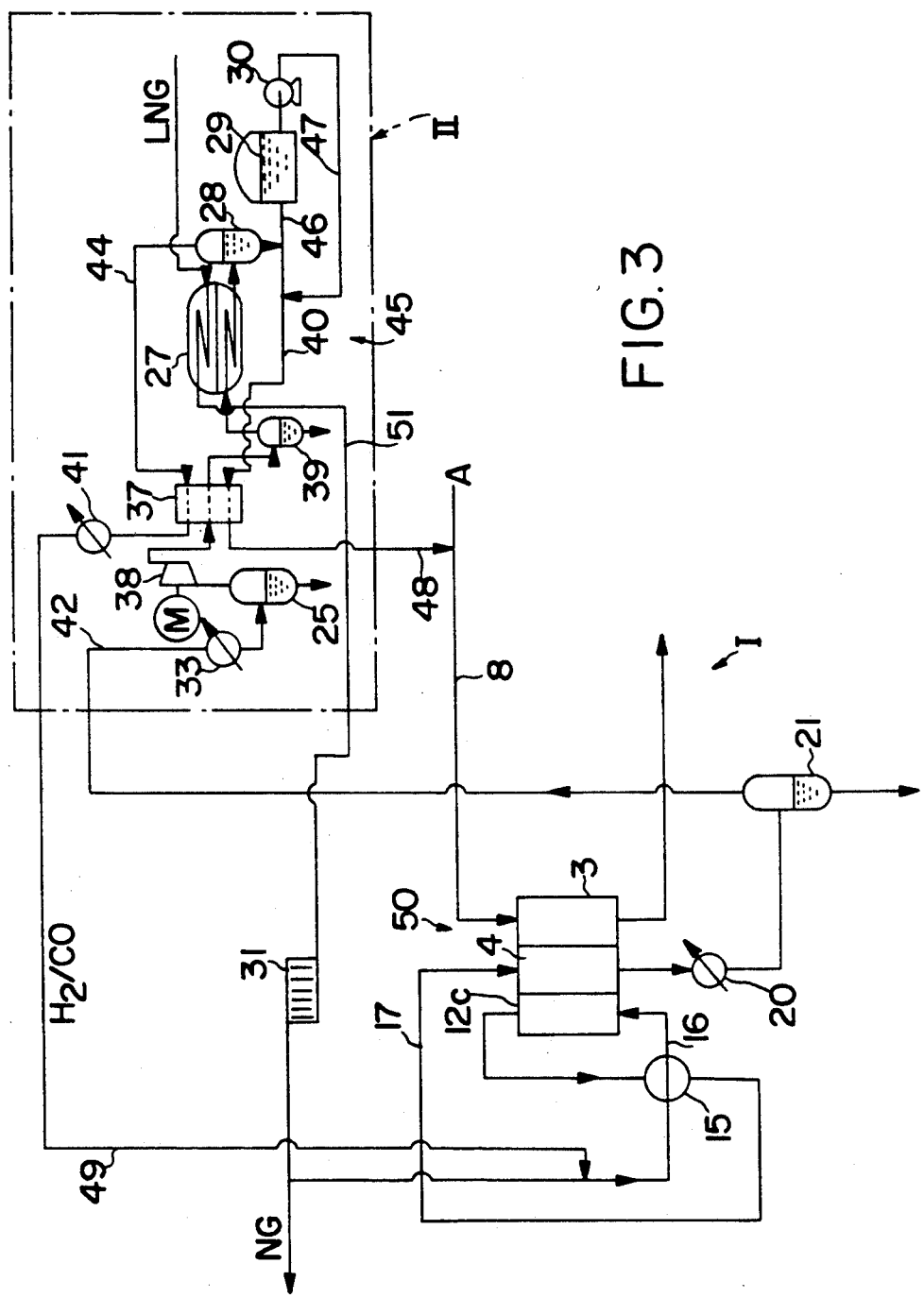
FIG. 3 illustrates a still another embodiment of the present invention.

FIG. 3 shows another embodiment of the present invention. This cryogenic power generation system includes a molten carbonate type fuel cell 50 which has a reforming chamber 12c to reform natural gas with heat produced upon the cell reaction of the fuel cell. In addition, a second gas line 48 is provided to feed all or part of $CO_2$ gas separated and recovered by the $CO_2$ separating unit II of FIG. 2 as part of the oxidizing gas to be fed to the cathode chamber 3 of the fuel cell 50. Further, a third gas line 49 is provided to feed to the inlet of the reforming chamber gases which remain in the $CO_2$ separating unit II after the $CO_2$ recovery. This arrangement improves the power generation efficiency. More specifically, $CO_2$ contained in the gases is liquefied and separated from the gases with LNG of low temperature. The second recovery line 40 of the $CO_2$ separating unit II of FIG. 2, which gasifies the liquefied $CO_2$ again and recovers it, and the air feed line 8, which feed the air A to the cathode chamber 3 of the fuel cell 1, are connected with each other by the second gas line 48 so that $CO_2$ is recirculated to the cathode chamber 3 together with the air A. Gases which remains, after the $CO_2$ recovery, in the $CO_2$ separating unit II are recirculated to the inlet of the reforming chamber 12c by the third gas line 49.

In this embodiment, the $CO_2$ separator unit II takes advantages of the cryogenic temperature of LNG to liquefy and separate $CO_2$, and the liquefied $CO_2$ is gasified when recovered. The recovered gaseous $CO_2$ returns to the cathode chamber 3 of the fuel cell 50 whereas the residual gases ($H_2$ and CO) after the $CO_2$ separation at the $CO_2$ separator unit II return to the inlet of the reforming chamber. Thus, it is possible to improve the power generation efficiency of the fuel cell 50.

In the cryogenic power generation system shown in FIG. 3, like those illustrated in FIGS. 1 and 2, $CO_2$ contained in the gases discharged from the thermal electric power plant may be introduced into the air feed line 8 and in turn into the cathode chamber 3. In addition, the $CO_2$ separator unit II may send out $CO_2$ in the form of liquid although the unit II of FIG. 3 sends out $CO_2$ in the form of gas.

As to the fuel cell 50, the foregoing description deals with the fuel cell 50 which has the reforming chamber 12c that reforms natural gas with heat generated upon the cell reaction of the fuel cell 50. In other words, the reforming chamber 12c is located in the fuel cell 50. However, the embodiment of FIG. 3 may be also applied to the systems of FIGS. 1 and 2, respectively. More specifically, this embodiment is applicable to cases where part of the cathode gas and anode gas discharged from the fuel cell are respectively introduced to the combustion chamber 12b of the reformer 12. In such a case, like the system of FIG. 3, there may be provided a second gas line 48 and a third gas line 49, and there may be provided a fourth gas line 52 and a fifth gas line 53 for introducing part of the anode gas discharged from the anode chamber 4 and part of the cathode gas discharged from the cathode chamber 3 to the combustion chamber 12b of the reformer 12.

Figure 4:
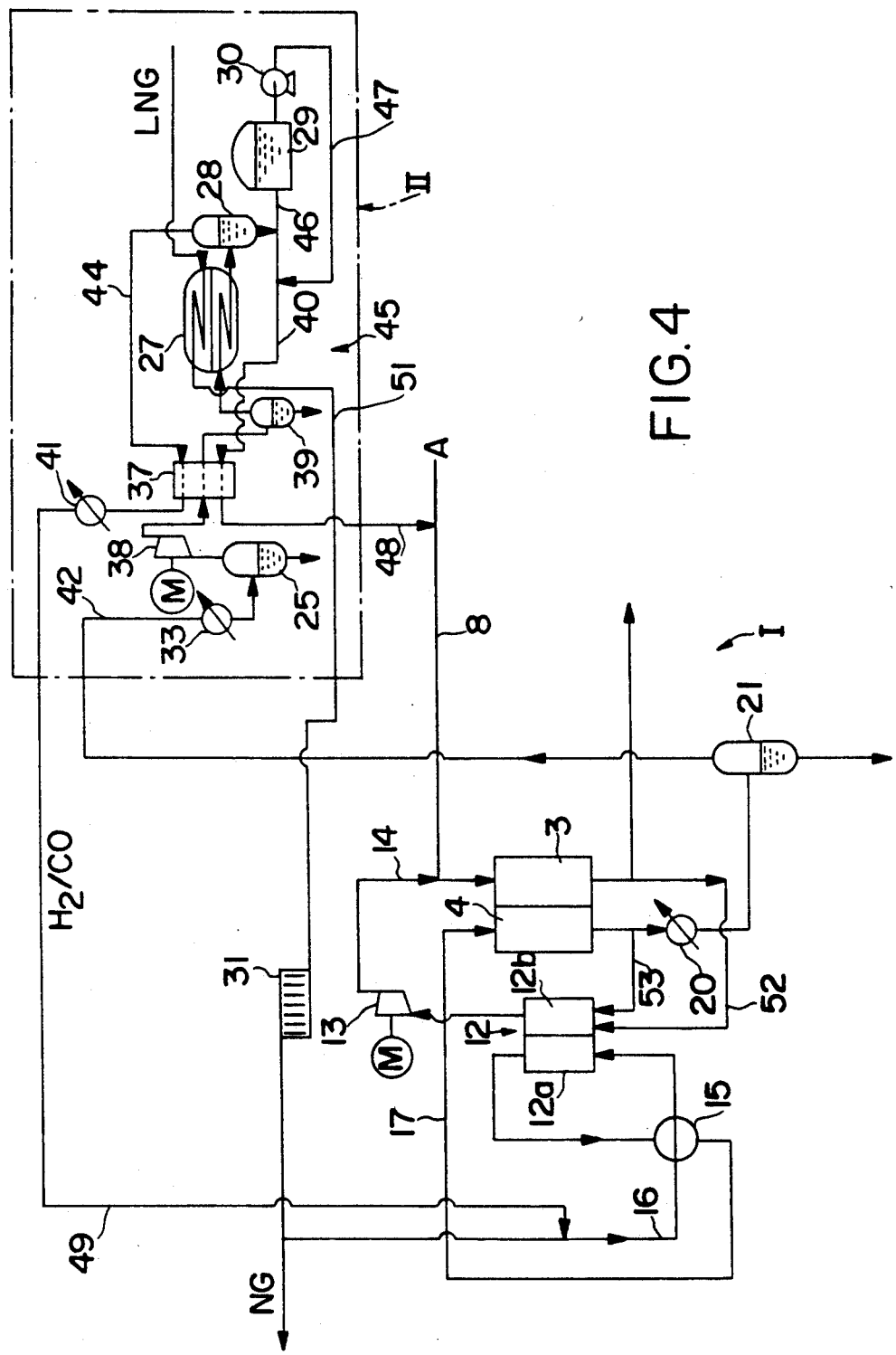
FIG. 4 also shows a yet another embodiment according to the present invention.
Figure 5:
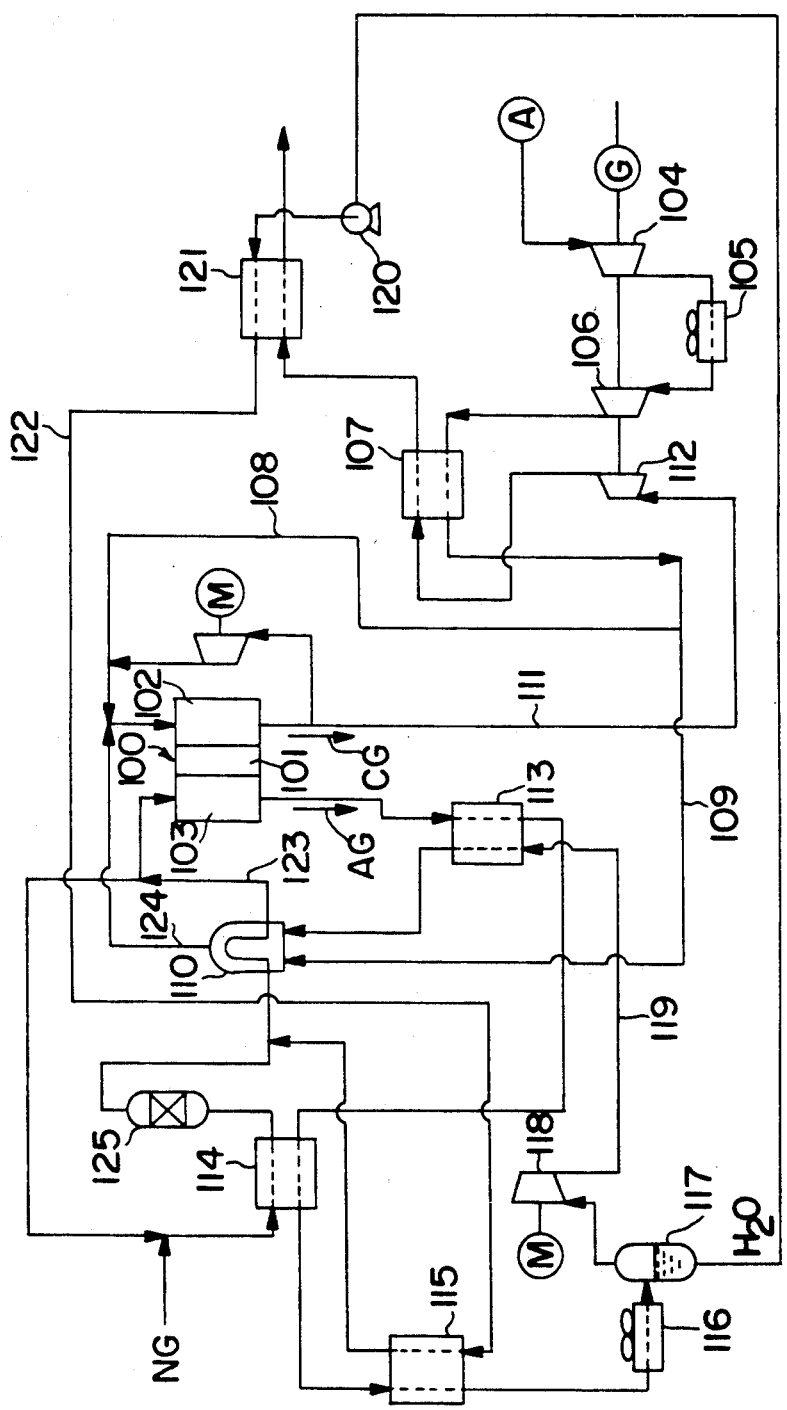
FIG. 5 schematically illustrates a block diagram of a conventional power generation system.

In the systems of FIGS. 3 and 4, even if an excessive amount of $H_2$ and CO are fed into the anode chambers 4 of the fuel cells 1 and 50, these gases ($H_2$ and CO) are recirculated in the systems via the separator unit II so that the fuel utilization factor of the entire system is not deteriorated and the "one-pass" fuel utilization factor at the anode chamber 4 can be set low. This raises the cell voltage. In addition, according to the system of FIG. 4, even if the reforming rate at the reformer 12 is not set to high, non-reformed $CH_4$ circulates in the system and the system efficiency is not lowered.

The present invention is not limited to the above-described embodiments. For example, FIGS. 1 and 2 show the systems for the thermal electric power plant 5. However, the present invention can be applied to other type of power plants. In addition, the gases discharged from the power plant are mixed with the air before they are introduced to the cathode chamber of the fuel cell in the illustrated embodiments. However, the recirculation gas line 24 may be omitted if $CO_2$ produced in the system is liquefied and separated from the gases by the cryogenic LNG and fed to the cathode chamber of the fuel cell. Furthermore, although part of natural gas NG gasified by the $CO_2$ separator unit II is introduced to the entrance of the reformer in the illustrated embodiments, this is not a requisite. Moreover, another fuel cell may be provided downstream of the turbine 10 and the gases passing through the turbine 10 may be introduced to a cathode chamber of this fuel cell.

We claim:

1. A power generation system using a molten carbonate fuel cell, comprising:
   a fuel cell having a reformer, a cathode chamber, an anode chamber and an electrolyte tile impregnated with molten carbonate, LNG being transformed to gaseous form and then reformed by the reformer, reformed NG being fed to the anode chamber and oxidizing gas being fed to the cathode chamber, the reformer having a reforming chamber and the reforming chamber having an inlet; and
   a $CO_2$ separator unit for liquefying $CO_2$ contained in gases discharged from the anode chamber using cryogenic LNG so as to separate $CO_2$ from the gases.

2. The power generation system of claim 1, further including a first gas line for introducing to the cathode chamber gases discharged from the $CO_2$ separator unit.

3. The power generation system of claim 1 or 2, wherein the $CO_2$ separator unit includes a liquid recovery section for the liquefied $CO_2$.

4. The power generation system of claim 1 or 2, wherein the $CO_2$ separator unit includes:
   an indirect heating heat exchanger for liquefying $CO_2$ contained in the gases discharged from the anode chamber using cryogenic LNG; and
   a gas-liquid separating drum connected with the indirect heating heat exchanger for separating the liquefied $CO_2$ from gas component of gases discharged from the indirect heating heat exchanger.

5. The power generation system of claim 4, further including:
   an introduction line connected with the indirectly heating heat exchanger for introducing the gases discharged from the anode chamber;
   a residual gas line connected with the gas-liquid separating drum for discharging gases from which $CO_2$ is removed; and
   a gas heat exchanger spanning the introduction line and the residual gas line for preheating the non-$CO_2$-containing gases with the gases discharged from the anode chamber.

6. The power generation system of claim 3, wherein the $CO_2$ separator unit further includes:
   an indirect heating heat exchanger for liquefying $CO_2$ contained in the gases discharged from the anode chamber using the cryogenic LNG;
   a gas-liquid separating drum connected with the indirect heating heat exchanger for separating the liquefied $CO_2$ from gas component of gases discharged from the indirect heating heat exchanger; and
   a storage tank connected with the gas-liquid separating drum for storing the liquefied $CO_2$.

7. The power generation system of claim 6, further including a first recovery line connected with the storage tank for sending the liquefied $CO_2$ of the storage tank into the $CO_2$ treating device.

8. The power generation system of claim 7, further including a pump provided on the first recovery line.

9. The power generation system of claim 8, further including:
   an introduction line connected with the indirect heating heat exchanger for introducing the gases discharged from the anode chamber;
   a residual gas line connected with the $CO_2$ separating drum for discharging the non-$CO_2$-containing gases; and
   a gas heat exchanger spanning the introduction line and the residual gas line for preheating the non-$CO_2$-containing gases with the gases discharged from the anode chamber.

10. The power generation system of claim 9, further including a cooling device provided on the introduction line at a position upstream of the indirect heating heat exchanger.

11. The power generation system of claim 10, further including a first gas-liquid separator unit provided on the introduction line between the indirect heating heat exchanger and the cooling device.

12. The power generation system of claim 11, further including a heating device provided on the residual gas line at a position downstream of the gas heat exchanger.

13. The power generation system of claim 1, wherein the $CO_2$ separator unit includes a gas recovery section for gasifying and recovering the liquefied and separated $CO_2$.

14. The power generation system of claim 13, further including a first gas line for introducing into the cathode chamber non-$CO_2$-containing gases discharged from the $CO_2$ separation unit.

15. The power generation system of claim 13, further including a second gas line for introducing into the cathode chamber $CO_2$ recovered by the gas recovery section of the $CO_2$ separator unit.

16. The power generation system of claim 13, further including a third gas line for introducing into the inlet of the reforming chamber non-$CO_2$-containing gases discharged from the $CO_2$ separator unit.

17. The power generation system of claim 13, further including:
   a second gas line for introducing into the cathode chamber $CO_2$ recovered by the gas recovery section of the $CO_2$ separator unit; and
   a third gas line for introducing into the inlet of the reforming chamber non-$CO_2$ containing gases discharged from the $CO_2$ separator unit.

18. The power generation system of claim 17, further including:
   a fourth gas line for introducing into the combustion chamber of the reformer gases discharged from the cathode chamber; and
   a fifth gas line for introducing into the combustion chamber of the reformer gases discharged from the anode chamber.

19. The power generation system of claim 13, 14, 15, 16, 17 or 18, wherein the $CO_2$ separator unit includes:
   an indirect heating heat exchanger for liquefying $CO_2$ contained in gases discharged from the anode chamber with cryogenic LNG; and
   a gas liquid separating drum connected with the indirect heat exchanger for separating the liquefied $CO_2$ from the gases discharged from the indirect heat exchanger.

20. The power generation system of claim 13, 14, 15, 16, 17 or 18, wherein the $CO_2$ separator unit includes:
   an indirect heat exchanger for liquefying $CO_2$ contained in gases discharged from the anode chamber with LNG;
   a $CO_2$ separating drum connected with the indirect heat exchanger for separating the liquefied $CO_2$ from gases discharged from the indirect heat exchanger;
   a second recovery line for recovering the liquid $CO_2$ of the $CO_2$ separating drum and sending it to the $CO_2$ treating device;
   an introduction line for introducing into the indirect heat exchanger gases discharged from the anode chamber;
   a residual gas line for discharging non-$CO_2$-containing gases of the $CO_2$ separating drum; and
   a multi-fluid heat exchanger provided on the second recovery line, the introduction line and the residual gas line for cooling the gases discharged from the anode chamber with the liquefied $CO_2$ and the non-$CO_2$-containing gas so as to gasify the liquefied $CO_2$.

21. The power generation system of claim 20, further including a compressor provided on the introduction line at a position upstream of the multi-fluid heat exchanger.

22. The power generation system of claim 21, further including a second gas-liquid separator provided on the introduction line between the indirect heat exchanger and the multi-fluid heat exchanger.

23. The power generation system of claim 20, further including:
   a branch line on the second recovery line between the $CO_2$ separating drum and the multi-fluid heat exchanger; and
   a storage tank provided on the branch line for reserving the liquid $CO_2$.

24. The power generation system of claim 23, further including:
   a return line connected with the storage tank at one end thereof and with the second recovery line between the branch line and the multi-fluid heat exchanger at the other end thereof.

25. The power generation system of claim 24, further including a pump provided on the return line.

26. The power generation system of claim 25, further including a heater provided on the residual gas line at a position downstream of the multi-fluid heat exchanger.

27. The power generation system of claim 22, further including a cooling device provided on the introduction line at a position upstream of the compressor.

28. The power generation system of claim 27, further including a first gas-liquid separator provided on the introduction line between the cooling device and the compressor.

* * * * *